(12) United States Patent
Edholm et al.

(10) Patent No.: US 10,470,363 B2
(45) Date of Patent: Nov. 12, 2019

(54) HEIGHT ADJUSTMENT ARRANGEMENT FOR A LAWN MOWER

(75) Inventors: Fredrik Edholm, Jönköping (SE); Helena André, Bankeryd (SE); Magnus Henriksson, Jönköping (SE); Jasmin Insanic, Jönköping (SE); Jörgen Johansson, Jönköping (SE); Jonas Tibbelin, Huskvarna (SE); Mikael Adolfsson, Gränna (SE); Karl Ljungquist, Jönköping (SE)

(73) Assignee: HUSQVARNA AB, Huskvarna (SE)

( * ) Notice: Subject to any disclaimer, the term of this patent is extended or adjusted under 35 U.S.C. 154(b) by 838 days.

(21) Appl. No.: 14/122,770

(22) PCT Filed: May 31, 2011

(86) PCT No.: PCT/SE2011/050677
§ 371 (c)(1),
(2), (4) Date: Nov. 27, 2013

(87) PCT Pub. No.: WO2012/166027
PCT Pub. Date: Dec. 6, 2012

(65) Prior Publication Data
US 2014/0083072 A1     Mar. 27, 2014

(51) Int. Cl.
*A01D 34/00*     (2006.01)
*A01D 34/74*     (2006.01)
(52) U.S. Cl.
CPC .................................. *A01D 34/74* (2013.01)
(58) Field of Classification Search
CPC .......................... A01D 34/74; A01D 2034/645
(Continued)

(56) References Cited

U.S. PATENT DOCUMENTS 2,848,859 A * 8/1958 Abel .............................. 56/17.2
2,941,610 A   6/1960 Clemson
(Continued)

FOREIGN PATENT DOCUMENTS

CN     2479725 Y     3/2002
CN     1377572 A     11/2002
(Continued)

OTHER PUBLICATIONS

International Search Report and Written Opinion of PCT/SE2011/050677 mailed Feb. 15, 2012.
(Continued)

*Primary Examiner* — Arpad Fabian-Kovacs
(74) *Attorney, Agent, or Firm* — Burr & Forman LLP

(57) ABSTRACT

A height adjustment arrangement (1) for a lawn mower (20) for changing a cutting height is provided. The height adjustment arrangement comprises a respective link arm (2a, 2b) pivotally arranged at opposite sides of the chassis (21), and a transversal rod (5) extending between the link arms (2a, 2b) comprising wheel attachment ends (6a, 6b) configured to protrude outwardly from the respective link arm (2a, 2b). The height adjustment arrangement further comprises a locking arrangement (11) for releaseably locking at least one of the link arms (2a, 2b) in a pivot position. The transversal rod comprises connection portions (9a, 9b) which are essentially parallel to the link arms and releasably connected thereto such that pivoting of the link arm (2a, 2b) causes the wheel attachment ends (6a, 6b) to synchronously change the cutting height of the lawn mower chassis (21).

20 Claims, 2 Drawing Sheets

(58) Field of Classification Search
USPC ............... 56/17.2, 17.1; 280/43.13, 124.135
See application file for complete search history.

(56) References Cited

U.S. PATENT DOCUMENTS

| | | | | |
|---|---|---|---|---|
| 3,040,830 | A | * | 6/1962 | Lamprecht ..................... 56/10.8 |
| 3,292,351 | A | * | 12/1966 | Larson et al. ................. 56/17.2 |
| 3,357,715 | A | * | 12/1967 | Plamper et al. .......... 280/43.13 |
| 3,388,759 | A | | 6/1968 | Plamper et al. |
| 3,677,574 | A | | 7/1972 | Cyr |
| 3,680,880 | A | * | 8/1972 | Blaauw .................. A01D 34/63 |
| | | | | 280/43 |
| 3,706,189 | A | * | 12/1972 | Rutherford .......... A01D 34/005 |
| | | | | 56/13.4 |
| 3,719,371 | A | * | 3/1973 | Musgrave .............. 280/124.135 |
| 4,224,785 | A | * | 9/1980 | Hoch ............................. 56/17.4 |
| 4,835,952 | A | * | 6/1989 | McLane ........................ 56/17.2 |
| 4,905,463 | A | * | 3/1990 | Eilles ............................ 56/17.2 |
| 5,230,208 | A | | 7/1993 | Hess et al. |
| 5,398,489 | A | * | 3/1995 | Oshima ................. A01D 34/68 |
| | | | | 56/17.2 |
| 5,526,633 | A | * | 6/1996 | Strong et al. .................. 56/17.2 |
| 6,082,083 | A | | 7/2000 | Stalpes et al. |
| 6,378,280 | B1 | | 4/2002 | Bone et al. |
| 6,729,116 | B1 | * | 5/2004 | Graus et al. ................... 56/17.2 |
| 6,941,739 | B1 | | 9/2005 | Gliser |
| 7,146,791 | B2 | | 12/2006 | Benway et al. |
| 7,540,134 | B1 | * | 6/2009 | Reich ............................ 56/17.1 |
| 7,741,793 | B2 | | 6/2010 | Lucas et al. |
| 8,166,737 | B2 | * | 5/2012 | Ninomiya .............. A01D 34/74 |
| | | | | 56/17.2 |
| 8,371,095 | B2 | * | 2/2013 | Grewe ................... A01D 34/67 |
| | | | | 56/17.1 |
| 2006/0060017 | A1 | | 3/2006 | Ruebusch et al. |
| 2009/0183481 | A1 | | 7/2009 | Lancaster et al. |
| 2011/0239610 | A1 | * | 10/2011 | Ninomiya .............. A01D 34/74 |
| | | | | 56/17.1 |
| 2011/0239612 | A1 | * | 10/2011 | Ninomiya et al. ............. 56/17.2 |
| 2012/0222395 | A1 | * | 9/2012 | Grewe et al. .................. 56/17.2 |

FOREIGN PATENT DOCUMENTS

| | | | | |
|---|---|---|---|---|
| CN | 2648790 | Y | | 10/2004 |
| CN | 202455823 | U | * | 10/2012 ............. A01D 34/00 |
| DE | 202004015965 | U1 | | 12/2004 |
| EP | 304903 | A | * | 3/1989 ............. A01D 34/74 |
| EP | 670105 | A2 | * | 9/1995 ............. A01D 34/74 |
| EP | 696413 | A1 | * | 2/1996 ............. A01D 34/68 |
| EP | 1749432 | A1 | | 2/2007 |
| GB | 2367475 | A | | 4/2002 |

OTHER PUBLICATIONS

Chapter I International Preliminary Report on Patentability of PCT/SE2011/050677 mailed Dec. 2, 2013.

The International Search Report and Written Opinion of PCT/SE2011/050677 mailed on Feb. 15, 2012.

Chapter 1 of the International Preliminary Report on Patentability of PCT/SE2011/050677 issued on Dec. 2, 2013.

* cited by examiner

HEIGHT ADJUSTMENT ARRANGEMENT FOR A LAWN MOWER

TECHNICAL FIELD

Embodiments herein relate to a height adjustment arrangement for a lawn mower. In particular, embodiments herein relate to changing a cutting height of a lawn mower chassis. Embodiments herein further relate to a lawn mower comprising a height adjustment arrangement.

BACKGROUND

A walk behind lawn mower comprises a chassis onto which wheels, a handle and a rotating cutting blade is arranged. If the lawn mower is motor driven, it comprises an engine which is arranged to rotate the cutting blade and/or drive one or more of the lawn mower wheels.

It is desirable to enable height adjustment of the lawn mower chassis, for example depending on the length of the grass to be cut, or the topography of the lawn.

Height adjustment is often provided for by axle arrangements comprising a lot of parts. A common solution is a separate machined wheel axle which is welded or stamped to link arms which are pivotally arranged on the chassis, such that by locking the link arms in different pivot positions relative to the chassis, the distance between the ground and the wheel axle may be varied according to a current situation.

A problem is that the link arms need to be made of thick steel plate because they take the load from the wheel axles.

Moreover, tubes are welded to the link arms for providing the pivot fastening interface to the chassis and holders for ball bearings.

A separate transversal rod is normally used to connect the left and right wheels if they are to be height adjustable synchronously, by adjusting only one of them.

The transversal rod too is often welded to the link arms.

A problem is hence that traditional height adjustment arrangements are rather complicated, for example since there are several critical factors in a welding process that affects the results, such height adjustment arrangements are time consuming and costly to produce.

SUMMARY

In view of the discussion above, it is an object for embodiments herein to provide an improved height adjustment system for a lawn mower.

According to a first aspect, the object is achieved by a height adjustment arrangement for a lawn mower for changing a cutting height of a lawn mower chassis. The height adjustment arrangement comprises a respective link arm pivotally arranged about a respective pivot point at opposite sides of the chassis. The height adjustment arrangement further comprises a transversal rod extending between the link arms. The transversal rod comprises respective wheel attachment ends. The wheel attachment ends are configured to protrude outwardly from the respective link arm at a distance from the respective pivot point. The height adjustment arrangement further comprises a locking arrangement for releasably locking at least one of the link arms in a pivot position corresponding to a desired cutting height of the chassis. The transversal rod further comprises respective connection portions which are essentially parallel to the link arms and releasably connected thereto by an interconnection means. The interconnection means is configured to maintain a relative position between the connection portion and the link arm such that pivoting of the link arm causes the wheel attachment ends to synchronously change the cutting height of the lawn mower chassis.

Thanks to the interconnection means between the connection portion and the link arm, torsional forces are absorbed by the transversal rod. This relieves the link arm which can consequently be made of a thinner plate.

Moreover, there is no need for separate wheel axles, which reduces the number of welding operations and/or fasteners.

By "cutting height" of the chassis is understood the distance between the chassis above the ground. Since the cutting blade is attached to the chassis, the adjustment of height of the chassis above the ground changes the distance between the cutting blade and the ground and thus the cutting height at which the grass is cut.

In some embodiments, the interconnection means is a fork portion on the link arm configured to receive the connection portion of the transversal rod. This provides an efficient way of interlocking the transversal rod and the link arm to maintain a relative position between them.

In some embodiments, the pivot point is provided by a plastic bushing which is arranged between the chassis and the link arm by snap locking. This further reduces the need for welding operations.

In some embodiments, the plastic bushing further provides a distance between the link arm and the chassis.

In some embodiments, the locking arrangement comprises an index plate and a handle arranged on the chassis and the link arm respectively, and wherein the handle is lockable to the index plate in at least two positions corresponding to different pivot positions of the link arm relative to the chassis.

In some embodiments, the handle is prestressed towards the index plate by an inherent elasticity. This reduces the number of parts, and thus weight and cost of the height adjustment assembly.

According to second aspect, the object is achieved by a lawn mower comprising a height adjustment arrangement according to embodiments herein.

Thanks to embodiments herein, wherein a separate link arm is attached to a combined wheel axle and transversal rod, simultaneous height adjustment at both sides of the chassis is provided for while enabling the use of a relatively thin link arm plate since torsional load is transferred to the transversal rod from the link arm.

Using a combined transversal rod and wheel axle is advantageous since it reduces weight and material costs.

Other objects, advantages and novel features of embodiments herein will become apparent from the following detailed description when considered in conjunction with the accompanying drawings and claims.

DETAILED DESCRIPTION

Embodiments herein may be exemplified in the following non-limiting description of embodiments.

Figure 1:
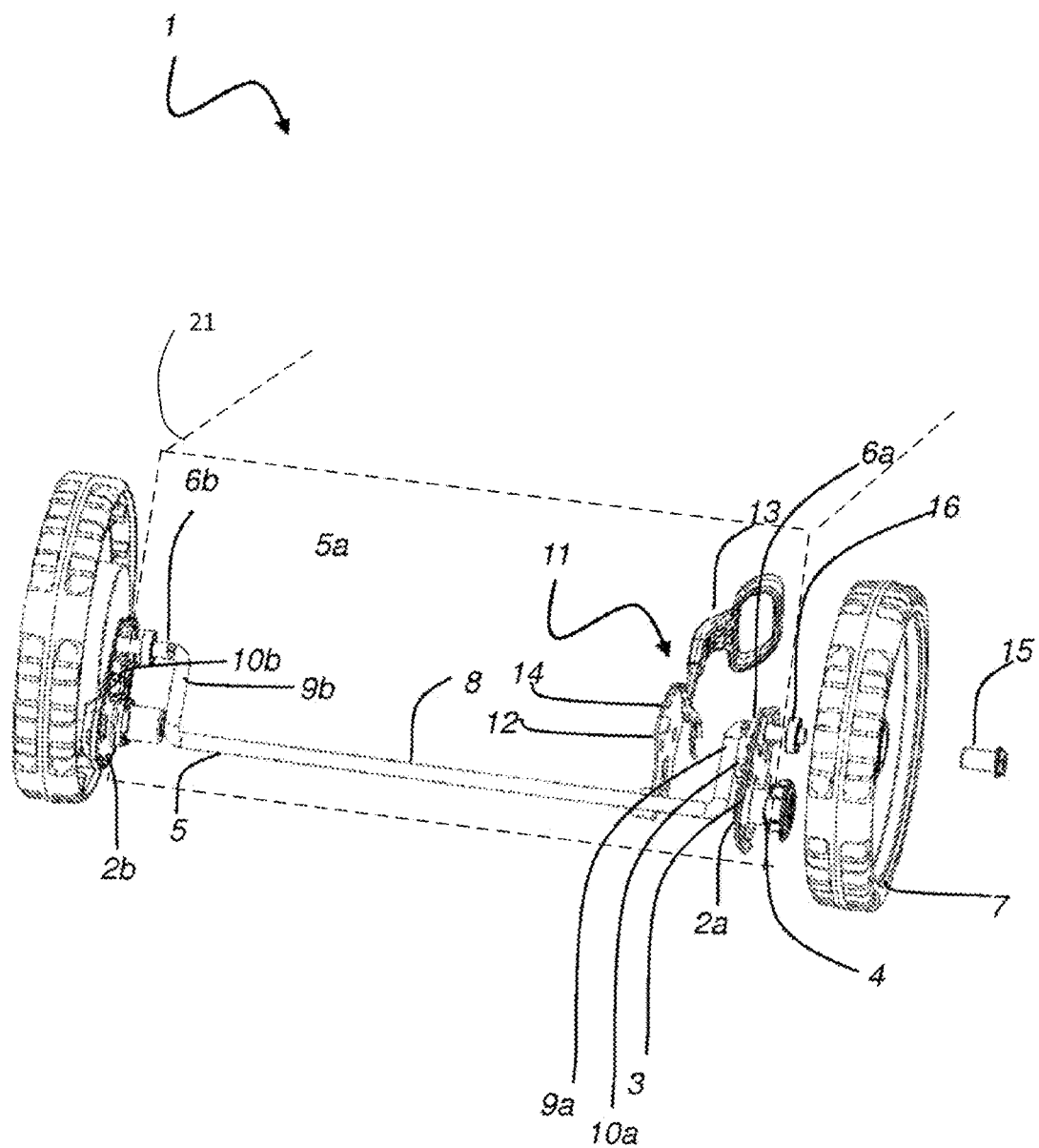
FIG. 1 is a schematic exploded view of a lawn mower comprising a height adjustment arrangement according to some embodiments herein.

FIG. 1 schematically depicts a height adjustment arrangement 1. For the sake of clarity, one side of the height adjustment arrangement 1 is illustrated in exploded view to provide a better view of various parts comprised therein.

The height adjustment arrangement 1 comprises a respective link arm 2 a, 2 b arranged on each side of a lawn mower chassis 21. The link arms 2 a, 2 b may be made of steel plate. The link arms 2 a, 2 b are configured to be pivotally arranged on the chassis 21 at a respective pivot point 3.

In the illustrated example, the attachment to the chassis 21 is provided by a bushing 4. In some embodiments the bushing 4 is plastic. In some embodiments, the bushing may be attached to the link arm 2a, 2b by snap locking.

In some embodiments, the bushing may be further configured to constitute a slide bushing for a drive axle. This may reduce the number of parts for height adjustment arrangements associated with drive wheels.

The height attachment arrangement 1 further comprises a transversal rod 5.

The transversal rod 5 has wheel attachment ends 6a, 6b onto which wheels 7 are mountable. The wheel attachment ends 6a, 6b are configured to protrude outwardly from the respective link arm 2a, 2b at a distance from the respective pivot points 3.

In some embodiments, the wheels 7 are attached to the wheel attachment ends 6a, 6b by star locking. This may be advantageous since the wheel attachment ends 6a, 6b may then not need to be machined.

The transversal rod 5 further has a middle portion 8 extending in an axial direction which is essentially parallel to the wheel attachment ends 6a, 6b.

Between the wheel attachment ends 6a, 6b and the middle portion 7, there are respective connection portions 9a, 9b. The connection portions 9a, 9b are in this example essentially parallel to the link arms 2a, 2b, and hence essentially orthogonal to the axial direction.

The respective connection portions 9a, 9b are arranged to be releasably connected to a respective link arm 2a, 2b by a respective interconnection means 10a, 10b.

The respective interconnections means 10a, 10b are configured to maintain a relative position between the connection portion 9a, 9b and the link arm 2a, 2b such that pivoting of one of the link arms 2a, 2b causes the wheel attachment ends 6a, 6b to synchronously change the cutting height of the lawn mower chassis 21.

In the illustrated example, the interconnection means 10a, 10b is a fork portion, protruding from the link arms 2a, 2b and configured to receive the connection portions 9a, 9b therein. In some embodiments, the interconnection means 10a, 10b may be a flange, or a hook, or another suitable interconnection means. In some embodiments, the interconnection means 10a, 10b form an integrated part of the connection portion 9a, 9b and/or of the link arm 2a, 2b.

The height adjustment arrangement 1 further comprises a locking arrangement 11 for releasably locking at least one of the link arms 2a, 2b in a pivot position corresponding to a desired cutting height of the lawn mower (not shown).

In the illustrated example, the locking arrangement 11 comprises an index plate 12 configured to be fixed to the chassis 21, and a handle 13, configured to be fixed to the link arm 2 a, 2 b. The index plate 12 comprises recesses 14 configured to receive a portion of the handle 13, such that the handle 13 may be releasable locked in one of the recesses 14 that corresponds to the desired pivotal position of the link arm 2 a, 2 b.

In some embodiments, the handle 13 is arranged on the link arm (2a, 2b) by snap locking. This provides efficient assembly of the handle 13 to the link arm 2a, 2b.

In some embodiments, the handle 13 is prestressed towards the index plate 12 by its inherent elasticity. This enables quick and easy height adjustment of the lawn mower.

In some embodiments, the index plate 12 is arranged on the link arm 2a, 2b, and the handle 13 is arranged on the chassis 21.

In some embodiments, there is another suitable type of locking arrangement 11.

In the illustrated example, the link arms 2a, 2b are firmly attached by a wheel nut sleeve 15 which also works as a slide bushing against the wheel 7. The wheel nut sleeve 14 presses against an inner ring of a ball bearing 16, which in turn presses the link arm 2a, 2b against the a wheel axle flange (not shown).

This way, the whole wheel attachment arrangement 1 may be assembled with a relatively small amount of fasteners, and without welding operations. This provides for fast and efficient assembly and for a cost and weight reduction of the lawn mower.

In some embodiments, the height adjustment arrangement further comprises a rod (not shown) configured to enable simultaneous height adjustment of the front and the back of the lawn mower.

Figure 2:
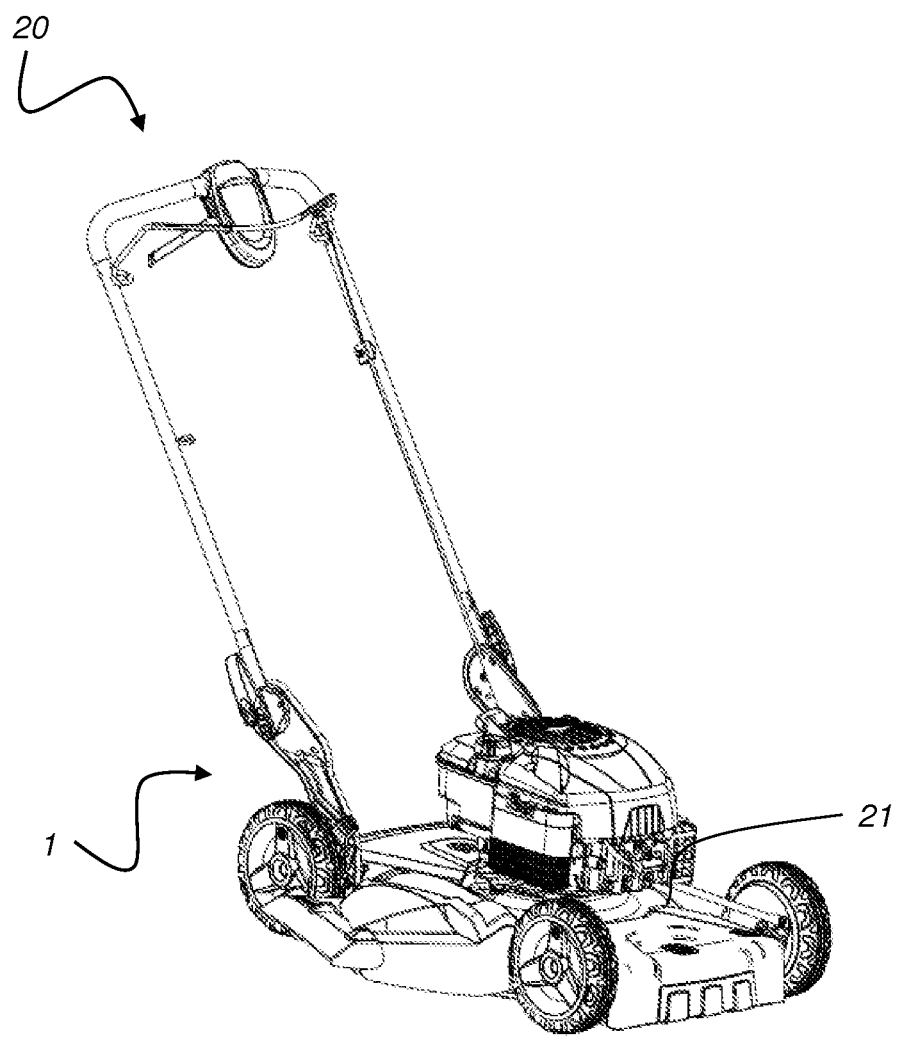
FIG. 2 is a schematic illustration of a lawn mower comprising a height adjustment arrangement according to some embodiments herein.

FIG. 2 schematically illustrates a lawn mower 20 comprising a height adjustment arrangement 1 according to embodiments herein. In this figure, the chassis 21 is depicted and indicated with numeral 21.

Thanks to embodiments herein, the link arm plate may be made relatively thin. The transversal rod 5, also constituting a wheel axle, being connected the link arms 2a, 2b at the connection portions 9a, 9b enables the transversal rod 5 to take the torsional load from the link arms 2a, 2b.

Moreover, thanks to embodiments herein wherein the link arms 2a, 2b are attached to a combined wheel axle and transversal rod 5, simultaneous height adjustment at both sides of the chassis 21 is provided for, while enabling the use of a relatively thin link arm plate, since torsional load is transferred to the transversal rod 5 thanks to the connection sections thereof being interconnected to the link arm 2a, 2b.

Using a combined transversal rod 5 and wheel axle according to embodiments is further advantageous since it reduces weight and material costs. It also enables a simplified height adjustment assembly 1, since no welding operations are needed thanks to the torsional forces being transferred to the connection portions 9a, 9b through the interconnection means 10a, 10b.

Embodiments herein hence provides for simple assembly using few fasteners, and a reduced number of parts, or details.

Moreover, according to embodiments herein, a production line for a lawn mower may be made more effective and flexible, since the various parts may be interconnected without welding operations etc, for example by snap locking. This provides for a modular height adjustment arrangement which is advantageous to optimize production lines and/or storage of the assembly.

When using the word "comprise" or "comprising" it shall be interpreted as non-limiting, i.e. meaning "consist at least of".

The embodiments herein are not limited to the above described preferred embodiments. Various alternatives, modifications and equivalents may be used.

Therefore, the above embodiments should not be taken as limiting the scope of the invention, which is defined by the appending claims.

The invention claimed is:

1. A height adjustment arrangement for a lawn mower for changing a cutting height of a lawn mower chassis, the height adjustment arrangement comprising:
a respective link arm pivotally attached about a respective pivot point at opposite sides of the chassis,
a transversal rod extending between the link arms and comprising respective wheel attachment ends configured to protrude outwardly from the respective link arm at a distance from the respective pivot point, and
a locking arrangement for releaseably locking at least one of the link arms in a pivot position corresponding to a selected cutting height of a plurality of cutting heights of the chassis,
wherein the transversal rod further comprises respective connection portions which are essentially parallel to the link arms and releasably connected thereto by an interconnection assembly configured to maintain a relative position between the connection portion and the link arm, such that pivoting of the link arm causes the wheel attachment ends to synchronously change the cutting height of the lawn mower chassis.

2. The height adjustment arrangement according to claim 1, wherein the interconnection assembly is a fork portion on the link arm configured to receive the connection portion.

3. The height adjustment arrangement according to claim 1, wherein the pivot point is a plastic bushing which attaches the chassis and the link arm by snap locking.

4. The height adjustment arrangement according to claim 3, wherein the plastic bushing further provides a distance between the link arm and the chassis.

5. The height adjustment arrangement according to claim 1, wherein the locking arrangement comprises an index plate and a handle arranged on the chassis and the link arm respectively, and
wherein the handle is lockable to the index plate in at least two positions corresponding to different pivot positions of the link arm relative to the chassis.

6. The height adjustment arrangement according to claim 5, wherein the handle is prestressed to be biased towards the index plate.

7. A lawn mower comprising a height adjustment arrangement for changing a cutting height of a lawn mower chassis, the height adjustment arrangement comprising:
a respective link arm pivotally attached about a respective pivot point at opposite sides of the chassis,
a transversal rod extending between the link arms and comprising respective wheel attachment ends configured to protrude outwardly from the respective link arm at a distance from the respective pivot point, and
a locking arrangement for releaseably locking at least one of the link arms in a pivot position corresponding to a selected cutting height of a plurality of cutting heights of the chassis,
wherein the transversal rod further comprises respective connection portions which are essentially parallel to the link arms and releasably connected thereto by an interconnection assembly configured to maintain a relative position between the connection portion and the link arm, such that pivoting of the link arm causes the wheel attachment ends to synchronously change the cutting height of the lawn mower chassis.

8. The lawn mower according to claim 7, wherein the interconnection assembly is a fork portion on the link arm configured to receive the connection portion.

9. The lawn mower according to claim 7, wherein the pivot point is a plastic bushing which attaches the chassis and the link arm by snap locking.

10. The lawn mower according to claim 9, wherein the plastic bushing further provides a distance between the link arm and the chassis.

11. The lawn mower according to claim 7, wherein the locking arrangement comprises an index plate and a handle arranged on the chassis and the link arm respectively, and wherein the handle is lockable to the index plate in at least two positions corresponding to different pivot positions of the link arm relative to the chassis.

12. The lawn mower according to claim 11, wherein the handle is prestressed to be biased towards the index plate.

13. A lawn mower comprising:
a chassis;
a first link arm pivotally attached about a first pivot point at a first side of the chassis;
a first transversal rod comprising first and second wheel attachment ends operably coupled to first and second wheels of the lawn mower, respectively, the first wheel attachment end being configured to protrude outwardly from the first link arm at a distance from the first pivot point, and
a locking arrangement for releaseably locking the first link arm in a pivot position corresponding to a selected cutting height of a plurality of cutting heights of the chassis,
wherein the first transversal rod further comprises a first connection portion which is substantially parallel to the first link arm and releasably connected thereto by a first interconnection assembly configured to maintain a relative position between the first connection portion and the first link arm, such that pivoting of the first link arm causes the first and second wheel attachment ends to synchronously change the cutting height of the chassis.

14. The lawn mower according to claim 13, wherein the first transversal rod further comprises a middle portion and a second connection portion, wherein the first connection portion is positioned between the first wheel attachment end and the middle portion, wherein the second connection portion is positioned between the second wheel attachment end and the middle portion, and wherein the middle portion is substantially parallel to the first and second wheel attachment ends and substantially perpendicular to the first and second connection portions.

15. The lawn mower according to claim 14, further comprising:
a second link arm pivotally attached about a second pivot point at a second side of the chassis opposite the first side,
wherein the second wheel attachment end is configured to protrude outwardly from the second link arm at a distance from the second pivot point, and
wherein the second connection portion is substantially parallel to the second link arm and releaseably connected thereto by a second interconnection assembly configured to maintain a relative position between the second connection portion and the second link arm.

16. The lawn mower according to claim 13, further comprising:
a second link arm pivotally attached about a second pivot point; and a second transversal rod comprising third and fourth wheel attachment ends operably coupled to third and fourth wheels of the lawn mower, respectively, wherein the third wheel attachment end is configured to protrude outwardly from the second link arm at a distance from the second pivot point, and wherein the second transversal rod further comprises a second connection portion which is substantially parallel to the second link arm and releasably connected thereto by a second interconnection assembly configured to maintain a relative position between the second connection portion and the second link arm, such that pivoting of the second link arm causes the third and fourth wheel attachment ends to synchronously change the cutting height of the chassis.

17. The lawn mower according to claim 13, wherein the first interconnection assembly is a fork portion on the first link arm configured to receive the first connection portion.

18. The lawn mower according to claim 13, wherein the first pivot point comprises a plastic bushing which attaches the chassis and the first link arm by snap locking.

19. The lawn mower according to claim 18, wherein the plastic bushing further provides a distance between the first link arm and the chassis.

20. The lawn mower according to claim 13, wherein the locking arrangement comprises an index plate and a handle arranged on the chassis and the first link arm respectively, and wherein the handle is lockable to the index plate in at least two positions corresponding to different pivot positions of the first link arm relative to the chassis.

* * * * *